United States Patent
Scrima et al.

(10) Patent No.: US 10,854,356 B2
(45) Date of Patent: Dec. 1, 2020

(54) FIRE RESISTANT CABLE WITH CERAMIFIABLE LAYER

(71) Applicant: PRYSMIAN S.p.A., Milan (IT)

(72) Inventors: Vito Scrima, Milan (IT); Fabio Tosi, Milan (IT); Marco Andreoletti, Milan (IT); Carlo Castelli, Milan (IT)

(73) Assignee: PRYSMIAN S.p.A., Milan (IT)

( * ) Notice: Subject to any disclaimer, the term of this patent is extended or adjusted under 35 U.S.C. 154(b) by 200 days.

(21) Appl. No.: 16/301,278

(22) PCT Filed: May 17, 2016

(86) PCT No.: PCT/IB2016/052864
§ 371 (c)(1),
(2) Date: Nov. 13, 2018

(87) PCT Pub. No.: WO2017/199060
PCT Pub. Date: Nov. 23, 2017

(65) Prior Publication Data
US 2020/0294691 A1   Sep. 17, 2020

(51) Int. Cl.
*H01B 7/295* (2006.01)
*C08K 3/36* (2006.01)
(Continued)

(52) U.S. Cl.
CPC ............ *H01B 7/295* (2013.01); *C08K 3/22* (2013.01); *C08K 3/36* (2013.01); *C08L 23/0815* (2013.01);
(Continued)

(58) Field of Classification Search
CPC . H01B 7/295; C08L 23/0815; C08L 2201/02; C08K 3/36; C08K 2003/2224; C08K 2003/2227
(Continued)

(56) References Cited

U.S. PATENT DOCUMENTS

2002/0001715 A1*  1/2002  Redondo ............... H01B 3/441
                                                428/375
2003/0059613 A1*  3/2003  Tirelli .................... H01B 7/295
                                                428/375
(Continued)

FOREIGN PATENT DOCUMENTS

GB      2 360 780 A      10/2001
WO   WO 2007/121520 A1   11/2007
WO   WO 2016/038427 A1    3/2016

OTHER PUBLICATIONS

International Search Report dated Jan. 12, 2017 in PCT/IB2016/052864 filed May 17, 2016, 4 pages.

*Primary Examiner* — Sherman Ng
(74) *Attorney, Agent, or Firm* — Oblon, McClelland, Maier & Neustadt, L.L.P.

(57) ABSTRACT

A fire resistant cable comprising: a conducting element (2; 21); a layer, surrounding the conducting element, made of a ceramifiable composition comprising: —a thermoplastic polymer mixture comprising: (a) a copolymer of ethylene with a $C_4$-$C_{12}$ alpha-olefin, having a density of from 0.860 to 0.910 g/cm$^3$, a melt flow index not higher than 3 g/10 min and a melting point of 105° C. at most; (b) an ethylene homopolymer or copolymer of ethylene with a $C_4$-$C_{12}$ alpha-olefin, having a density of from 0.900 to 0.985 g/cm$^3$, a melt flow index not higher than 5 g/10 min and a melting point of at least 110° C.; and (c) a polyethylene grafted with an ethylenically unsaturated monomer; —at least 25 wt % of silica; —a fluxing agent selected from alkaline metal oxides or precursors thereof; —an inorganic hydroxide compound selected from magnesium hydroxide, aluminium hydroxide and mixtures thereof; —a stabilizing agent comprising a hydrated magnesium silicate in an amount of at least 5 wt %; weight percentages being based on the total weight of the ceramifiable composition. Upon exposure to elevated tem-
(Continued)

peratures such as those encountered in case of fire, the ceramifiable composition is transformed into a ceramic material capable of protecting the conducting element from fire and mechanical stresses. The fire resistant cable of the present invention can continue operating under fire conditions for a certain period of time.

14 Claims, 2 Drawing Sheets

(51) Int. Cl.
    *C08L 23/08*     (2006.01)
    *C08K 3/22*     (2006.01)

(52) U.S. Cl.
    CPC ............... *C08K 2003/2224* (2013.01); *C08K 2003/2227* (2013.01); *C08L 2201/02* (2013.01)

(58) Field of Classification Search
    USPC ........................................ 174/110 R
    See application file for complete search history.

(56) References Cited

U.S. PATENT DOCUMENTS

| | | | |
|---|---|---|---|
| 2005/0205290 A1* | 9/2005 | Pinacci | H01B 7/295 174/121 A |
| 2006/0068201 A1 | 3/2006 | Alexander et al. | |
| 2006/0237215 A1* | 10/2006 | Alexander | H01B 7/295 174/110 R |
| 2007/0246240 A1* | 10/2007 | Alexander | C04B 35/66 174/36 |
| 2009/0099289 A1 | 4/2009 | Alexander | |
| 2013/0170800 A1* | 7/2013 | Consonni | G02B 6/4436 385/100 |
| 2016/0189829 A1* | 6/2016 | Bates | H01B 3/004 428/383 |

* cited by examiner

FIRE RESISTANT CABLE WITH CERAMIFIABLE LAYER

BACKGROUND OF THE INVENTION

The present invention relates to a fire resistant cable for power transmission or for telecommunications. More particularly, the present invention relates to a fire resistant cable which is capable of continuing to operate and maintain circuit integrity for a certain period of time when subjected to fire. The cable of the present invention is also resistant to water and mechanical stresses, such as those caused by the water jets used in fire-extinguishing operations. Also, the present invention relates to a ceramifiable composition suitable for producing said cable.

As known, for example, from IEC 60331 and CEI 20-22/2, an energy or data cable resistant to fire (known as a "fire resistant" cable) is a cable configured so as to be capable of continuing to function with acceptable performance even if, owing to a fire, it is exposed to a direct flame for a period of time, at temperatures of up to 800° C.–900° C. or above.

Fire resistant cables are used for various purposes in the fields of civil constructions and transportation, where they are used, for example, in emergency lightings, alarm and automatic fire detection systems, fire extinguishing systems, automatic emergency exits, lift systems, activation of smoke outlets or shutters, fans, air conditioning, and telephone and video surveillance systems.

In the state of the art fire resistant cable are generally produced by extruding over the core of the cable a fire resistant coating made of a polymer composition which has been given fire resistant properties by the addition of suitable additives.

In particular, fire resistant cables are known which comprise ceramifiable compositions forming a fire resistant ceramic at elevated temperatures. Typically, the ceramifiable compositions comprise ceramifying fillers dispersed in a crosslinkable polymer matrix. The manufacturing of cable layers formed by crosslinked polymers, however, requires a crosslinking step that makes the overall cable manufacturing process rather long and expensive.

In the manufacturing of cable layers, thermoplastic polymer-based materials, which are not crosslinked, are also used as an alternative to crosslinked polymer materials. However, the mechanical properties of the non-crosslinked thermoplastic materials, especially when charged with inorganic fire-resistant fillers, are too poor to make them suitable materials for manufacturing cable layers.

US 2006068201 describes energy cables comprising an insulating layer and/or a sheathing for providing a fire resistant ceramic under fire conditions, the insulating layer and/or sheathing layer comprising:
  at least 15% by weight based on the total weight of the composition of a polymer base composition comprising at least 50% by weight of an organic polymer;
  at least 15% by weight based on the total weight of the composition of a silicate mineral filler, and
  at least one source of fluxing oxide which is optionally present in said silicate mineral filler, wherein after exposure to an elevated temperature experienced under fire conditions, a fluxing oxide is present in an amount of from 1 to 15% by weight of the residue.

The fluxing oxide is likely to be boron oxide or a metal oxide selected from the oxides of potassium and sodium. A precursor of the fluxing oxide can be a metal carbonate precursor to the metal oxides. The composition may contain silicon dioxide as a result of being exposed to elevated temperature. Silica may also be added as a separate filler component.

WO 2011/112704 relates to insulation and cable jackets with micro oxide particles used with cable and cable components for increasing the flame retardancy. In particular, the insulation material of at least one of the plurality of conductors and or the jacket, and or the bedding includes micro oxide particles to form a composite. Preferred oxides include silicon, aluminium, magnesium and their double oxides. The micro oxide particles are preferably solid non porous amorphous particles. The micro oxide particles may be added to polyethylene or ethylene vinyl acetate. The concentration of the micro oxide particles may be about 1 to 80% by weight of the insulation, and most preferred about 3-25%. Stabilizers may be added to the composite insulation. Examples of stabilizers include lead stabilizer. A non-lead example is hydrotalcite. The composite insulation may include alumina trihydrate, magnesium hydroxide.

US 2015/0170789 relates to a cable comprising a fire resistant composition. The fire resistant composition can include from about 15% to about 45% of organic polymer. The fire resistant composition can be a fire resistant thermoplastic composition. The fire resistant composition can include about 20% to 45% by weight of non-reactive silicates. Talc is preferred. The fire resistant composition can include about 2% to 15% by weight of high melting oxide fillers. Fumed silica is preferred.

EP 2879135 relates to a cable comprising an inner sacrificial layer obtained from a fire resistant composition. The fire resistant composition includes at least one organic polymer and at least one inorganic non polymeric material. The inorganic non polymeric material can include at least about 2% by weight of silica ($SiO_2$). The organic polymer can be selected from ethylene-butene copolymer, linear low density polyethylene (LLDPE), ethylene-octene copolymer. The inorganic filler can be selected from non-reactive silicates such as talc (about 20% to about 60% by weight of non-reactive silicates).

U.S. Pat. No. 6,924,031 relates to cables having low-smoke self-extinguishing properties, and to the flame-retardant compositions used therein. The flame-retardant compositions are used in non-crosslinked form to obtain a coating with thermoplastic properties. The flame-retardant coating comprises:
  (a) an ethylene homopolymer or copolymer having a density of from 0.905 to 0.970 $g/cm^3$ and being selected from: ethylene homopolymers; copolymers of ethylene with an alphaolefin; copolymers of ethylene with an ethylenically unsaturated ester; or mixtures thereof;
  (b) a copolymer of ethylene with at least one alphaolefin, and optionally with a diene, said copolymer (b) having a density of from 0.860 to 0.904 $g/cm^3$ and being characterized by a composition distribution index greater than 45%, said index being defined as the weight percentage of copolymer molecules having an alpha-olefin content within 50% of the average total molar content of alpha-olefin;
  (c) natural magnesium hydroxide in an amount such as to impart flame-retardant properties;
  wherein at least one of the polymeric components (a) and (b) contains hydrolyzable organic silane groups grafted onto the polymer chain.

SUMMARY OF THE INVENTION

In the light of the above discussed state of the art, the Applicant faced the problem of providing a thermoplastic extrudable ceramifying composition capable, when burnt, of forming uniform and coherent ceramic layer, substantially free from cracks and swellings. In particular, the ceramic layer resulting from heat exposure should be solid enough to withstand mechanical stresses, such as vibration, impact, compression and the like, which the cable can suffer during the fire extinguishing and evacuation operations (e.g. water jets by hydrants).

In addition, the thermoplastic extrudable ceramifying compositions should have mechanical features complying with the standards for the application in power and telecommunication cables, especially as cable jacket.

The Applicant found that a composition based on a mixture of specific thermoplastic ethylene polymers which contains silica as main filler when compounded with a selected stabilizing agent can be used for manufacturing a cable having suitable mechanical performances in operation and is effective for maintaining the cable in operating condition in the presence of fire and mechanical stress for the required time period.

In particular, it has been found that a layer made of a thermoplastic ceramifiable composition comprising:
a thermoplastic polymeric base comprising ethylene polymers; and
silica in an amount suitable to create a ceramic structure upon burning;
and
a stabilizing agent comprising a hydrated magnesium silicate
has mechanical properties suitable for the manufacturing of a cable layer and, in case of fire, gives place to char suitable to maintain the cable performance also in the presence of stresses associated to emergency intervention.

The thermoplastic ceramifiable composition of the present invention, upon exposure to elevated temperatures such as those caused by a fire, reacts to form a ceramic layer having excellent fire resistant properties and which is substantially free from cracks and swellings such that the cable can withstand mechanical stresses such as those generated by water jets from hydrants and/or those generated by impacts. The fire resistant layer of the present invention thus effectively protects the conducting element from a fire, allowing the cable to operate and provide circuit integrity in case of a fire for a certain period of time.

Since the ceramifiable composition is based on a polymer mixture which is thermoplastic, the process of manufacturing of cable layers does not require any crosslinking step thus being faster and more cost-effective than the manufacturing processes used for crosslinked polymer compositions. Nonetheless, the resulting thermoplastic ceramifiable composition has mechanical properties—such as elongation at break and tensile strength—suitable for the use as cable layer, according to national and international standards.

Therefore, according to a first aspect, the present invention relates to a fire resistant cable comprising:
a conducting element;
a layer, surrounding the conducting element, made of a thermoplastic ceramifiable composition comprising:
a thermoplastic polymer mixture comprising:
(a) a copolymer of ethylene with a $C_4$-$C_{12}$ alpha-olefin, having a density of from 0.860 to 0.910 g/cm$^3$, a melt flow index not higher than 3 g/10 min and a melting point of 105° C. at most;
(b) an ethylene homopolymer or a copolymer of ethylene with a $C_4$-$C_{12}$ alpha-olefin, having a density of from 0.900 to 0.985 g/cm$^3$, a melt flow index not higher than 5 g/10 min and a melting point of at least 110° C.; and
(c) a polyethylene grafted with an ethylenically unsaturated monomer;
at least 25 wt % of silica;
a fluxing agent selected from alkaline metal oxides or precursors thereof;
an inorganic hydroxide selected from magnesium hydroxide, aluminium hydroxide and mixtures thereof;
a stabilizing agent comprising a hydrated magnesium silicate in an amount of at least 5 wt %;
weight percentages being based on the total weight of the ceramifiable composition.

According to a second aspect, the present invention relates to a thermoplastic extrudable ceramifiable composition comprising:
a thermoplastic polymer mixture comprising:
(a) a copolymer of ethylene with a $C_4$-$C_{12}$ alpha-olefin, having a density of from 0.860 to 0.910 g/cm$^3$, a melt flow index not higher than 3 g/10 min and a melting point of 105° C. at most;
(b) an ethylene homopolymer or a copolymer of ethylene with a $C_4$-$C_{12}$ alpha-olefin, having a density of from 0.900 to 0.985 g/cm$^3$, a melt flow index not higher than 5 g/10 min and a melting point of at least 110° C.; and
(c) a polyethylene grafted with an ethylenically unsaturated monomer;
at least 25 wt % of silica;
a fluxing agent selected from alkaline metal oxides or precursors thereof;
an inorganic hydroxide selected from magnesium hydroxide, aluminium hydroxide and mixtures thereof;
a stabilizing agent comprising a hydrated magnesium silicate in an amount of at least 5 wt %;
weight percentages being based on the total weight of the ceramifiable composition.

For the purpose of the present description and of the appended claims, by "fire resistant" it is meant the property of a cable provided with a material having the capacity of maintaining circuit integrity according to, for example, IEC 60331-1 and IEC 60331-1 (2009).

For the purpose of the present description and of the appended claims, by the expression "ceramifiable composition" it is meant an extrudable composition containing inorganic material/s which, when exposed to heating, e.g. such as that produced by a fire, at least partially burns and forms a ceramic material having a mechanical strength suitable to substantially retain its structural integrity, in terms of the original dimensions obtained after extrusion, even under a mechanical or thermal stress.

For the purpose of the present description and of the appended claims, by the expression "conducting element" it is meant an elongated element having an indefinite length that can be either made of an electrically conductive material, e.g. copper or aluminium or composite thereof, for the transportation of electrical energy or it can be an optical fiber for the transportation of light.

For the purpose of the present description and of the appended claims, the conducting element is surrounded by at least one layer comprising a ceramifiable composition (hereinafter referred to also as "ceramifiable layer").

For the purpose of the present description and of the appended claims, as "fluxing agent" is meant a substance suitable for lowering the melting point of the glass forming silica.

For the purpose of the present description and of the appended claims, the words "a" or "an" are employed to describe elements and components of the invention. This is done merely for convenience and to give a general sense of the invention. This description and claims should be read to include one or at least one and the singular also includes the plural unless it is obvious that it is meant otherwise.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purpose of the present description and of the appended claims, except where otherwise indicated, the weight percentages of each component that forms the ceramifiable composition are referred to the total weight of the ceramifiable composition.

For the purpose of the present description and of the appended claims, the amount of each component of the ceramifiable composition may be expressed also in terms of "per hundred rubber" (phr), i.e. in terms of parts by weight of the component with respect to 100 parts by weight of the thermoplastic polymer mixture present in the ceramifiable composition.

For the purpose of the present description and of the appended claims, the values of melt flow index (MFI) are meant to be measured according to ASTM D1238 04 (190° C./2.16 kg).

The fire resistant cable of the present invention can be used for the transportation of electrical energy and/or data.

When the cable of the present invention is an electrical cable, preferably said electrical cable is a cable for the transportation of low-voltage (LV) electrical currents, i.e. electrical currents of voltages equal to or lower than 1 kV.

When the cable of the present invention is a power cable, the ceramifiable layer is preferably used as bedding layer (or interstitial filler) and/or inner sheath.

When the cable of the present invention is a telecommunication cable containing optical fibres as conducting element, the ceramifiable layer is preferably used as cable jacket.

According to a preferred embodiment, the thermoplastic polymer mixture used as polymeric base of the ceramifiable composition comprises:

(a) from 65 parts to 90 parts of a copolymer of ethylene with a $C_4$-$C_{12}$ alpha-olefin, having a density of from 0.860 to 0.910 g/cm$^3$, a melt flow index not higher than 3 g/10 min and a melting point of 105° C. at most;

(b) from 10 parts to 30 parts of an ethylene homopolymer or copolymer of ethylene with a $C_4$-$C_{12}$ alpha-olefin, having a density of from 0.900 to 0.985 g/cm$^3$, a melt flow index not higher than 5 g/10 min and a melting point of at least 110° C.; and (c) from 5 parts to 15 parts of a polyethylene grafted with an ethylenically unsaturated monomer the parts being parts by weight of the component with respect to 100 parts by weight of the thermoplastic polymer mixture.

Preferably, the thermoplastic polymer mixture is present in the ceramifiable composition in an amount of at least 25 wt %, preferably up to 50 wt % based on the total weight of the ceramifiable composition.

The polymeric component (a) of the thermoplastic polymeric mixture of the present invention is a copolymer of ethylene with a $C_4$-$C_{12}$ alpha-olefin. A $C_4$-$C_{12}$ alpha-olefin is an olefin of formula $CH_2$=CH—R, wherein R is a linear or branched alkyl having from 2 to 12 carbon atoms. Preferably, the alpha-olefin is a $C_4$-$C_8$ alpha-olefin. The alpha-olefin can be selected, for example, from: 1-butene, 1-pentene, 4-methyl-1-pentene, 1-hexene, 1-octene, 1-decene, 1-dodecene and the like. 1-Hexene and 1-octene are particularly preferred.

The $C_4$-$C_{12}$ alpha-olefin is preferably present in the copolymer of the polymeric component (a) in an amount of from 10 wt % to 25 wt % by weight of copolymer.

The melt flow index of the polymeric component (a) is preferably from 0.5 to 2.5 g/10 min, more preferably from 0.5 to 2 g/10 min.

Preferably, the polymeric component (a) has a melting point within the range from to 30° C. to 105° C., more preferably from 45° C. to 90° C.

For the purpose of the present description and of the appended claims, the density of the polymeric component (a) is intended to be measured according to ASTM D792-08.

The ethylene copolymers (a) can be obtained by copolymerization of ethylene with at least one alpha-olefin, and optionally with at least one diene, in the presence of a "single-site" catalyst, for example a metallocene catalyst, as described, for example, in U.S. Pat. Nos. 5,246,783 and 5,272,236.

As to the ethylene homopolymer or copolymer (b), it may be selected from: high density polyethylene (HDPE) having a density preferably of from 0.940 to 0.985 g/cm$^3$; medium density polyethylene (MDPE) having a density of from 0.926 to 0.940 g/cm$^3$; low density polyethylene (LDPE) and linear low density polyethylene (LLDPE) having a density of from 0.900 to 0.926 g/cm, low density polyethylene (LDPE) and linear low density polyethylene (LLDPE) being preferred.

As said, the polymeric component (b) is an ethylene homopolymer or copolymer of ethylene with at least one $C_4$-$C_{12}$ alpha-olefin. A $C_4$-$C_{12}$ alpha-olefin is an olefin as already detailed above in connection with the ethylene copolymer (a). 1-Butene, 1-hexene and 1-octene are particularly preferred.

The melt flow index of the polymeric component (b) is preferably from 0.5 to 10 g/10 min, more preferably from 1 to 8 g/10 min.

Preferably, the polymeric component (b) has a melting point within the range from 110° C. to 125° C.

In accordance with the present invention, the density of the polymeric component (b) is intended to be measured according to ASTM D1505-03.

The ethylene homopolymer or copolymer (b) may be prepared according to well known techniques. More specifically, HDPE and MDPE may be prepared by a low to medium pressure ethylene homopolymerization in the presence of a Ziegler-Natta catalyst, providing an ethylene homopolymer with a very low branching degree. LDPE is generally produced by a high-pressure process wherein ethylene is homopolymerized in the presence of oxygen or a peroxide as initiator, giving rise to long-branched polyethylene chains. LLDPE is a short-branched copolymer of ethylene with at least one alpha-olefin, generally having from 4 to 12 carbon atoms. LLDPE may be prepared according to known low-pressure processes in the presence of a Ziegler-Natta catalyst or a chromium-based catalyst. In LLDPE, the alpha-olefin is preferably 1-butene, 1-hexene or 1-octene, and is present in the copolymer in an amount of from 1 to 15% by moles.

In the ceramifiable composition of the invention, the polyethylene grafted with an ethylenically unsaturated monomer (c) is used as compatibilizer in order to increase the interaction between the additives and the polymeric components and to help improving the mechanical properties of the composition.

The polyethylene onto which the ethylenically unsaturated monomer is grafted may be a copolymer of ethylene with an alpha-olefin. Grafting of the ethylenically unsaturated monomer can be obtained by means of a radical reaction (see for example patent EP-530,940). The amount of the at least one coupling agent grafted onto the polyethylene is generally from 0.05 to 5 parts by weight, preferably from 0.1 to 2 parts by weight, relative to 100 parts by weight of polyethylene.

The ethylenically unsaturated monomer grafted on polyethylene of polymeric component (c) may be, for example, a monocarboxylic or dicarboxylic acid having at least one ethylenic unsaturation or derivative thereof, such as maleic acid, maleic anhydride, fumaric acid, citraconic acid, itaconic acid, acrylic acid, methacrylic acid and the like, and anhydrides or esters derived from these, or mixtures thereof. Maleic anhydride is particularly preferred.

The ceramifiable composition of the invention comprises silica ($SiO_2$) in an amount of at least 25 wt % (about 65 phr). Preferably, the amount of silica is up to 40 wt % (about 130 phr). A silica content lower that 25 wt % could result insufficient for providing a composition which is ceramifiable. A silica content greater than 40 wt % could give place to a ceramifiable composition with mechanical properties unsuitable for the use as a cable layer and/or for the manufacturing thereof.

Advantageously, the silica of the ceramifiable composition of the invention is amorphous silica. Preferably, the amorphous silica is a powder material in which the particles have a substantially spherical shape. The use of an amorphous silica made of substantially spherical particles allows the extrusion of ceramifiable composition comprising significant amount of silica (greater than 25 wt %) without increasing the viscosity of the composition to an extent making cumbersome or even impossible the extrusion, at least at an industrially applicable speed.

The median diameter ($D_{50}$) of the silica spherical particles is preferably within the range 100-200 nm. The specific surface area (as measured by BET method) is preferably within the range 10-30 $m^2/g$.

The ceramifiable composition comprises a fluxing agent selected from alkaline metal oxides or precursors thereof. Preferably, the fluxing agent is selected from sodium oxide, potassium oxide, lithium oxide and precursor thereof, more preferably from sodium oxide, potassium oxide and precursor thereof.

Preferably, the fluxing agent is selected from precursors of alkaline metal oxides, such as sodium carbonate, potassium carbonate, lithium carbonate and mixtures thereof, because the alkaline metal oxides as such can have a corrosivity and/or reactivity difficult to handle in an industrial plant.

Advantageously, in the ceramifiable composition of the invention the fluxing agent is present in an amount of at least 5 wt % (about 14 phr), preferably up 10 wt % (about 29 phr) based on the total weight of the ceramifiable composition.

The ceramifiable composition comprises a stabilizing agent comprising a hydrated magnesium silicate (talc) in an amount of at least 5 wt % (about 13 phr) based on the total weight of the ceramifiable composition. Preferably, the hydrated magnesium silicate (talc) is in an amount lower than 13 wt % (about 38 phr). Amounts of hydrated magnesium silicate of 13 wt % or more could impair the mechanical features of the ceramifiable composition of the present invention.

As additional stabilizing agents, the ceramifiable composition may include also one or more compounds selected from: MgO, CaO, and PbO or a precursor thereof. For example, $CaCO_3$ can be used as a source of CaO and $MgCO_3$ can be used as source of MgO. In an embodiment, the stabilizing agent is preferably CaO or a precursors thereof.

Preferably, the ceramifiable composition comprises from 6 wt % to 25 wt % (from 17 to 71 phr) of stabilizing agent based on the total weight of the ceramifiable composition.

The ceramifiable composition of the present invention comprises also an inorganic hydroxide selected from magnesium hydroxide, aluminium hydroxide and mixtures thereof. Preferably, the hydroxide is aluminium hydroxide.

Preferably, the inorganic hydroxide is present in the ceramifiable composition of the present invention in an amount within the range from 0.1 wt % to 5 wt % (from 0.25 to 15 phr), preferably from 0.4 wt % to 3.5 wt % (from 1 to 10 phr) based on the total weight of the ceramifiable composition. Preferably, the hydroxide is aluminium hydroxide.

Without wishing to be bound to any theory to explain the present invention, the Applicant believes that the fluxing agent favors the formation of silicates compounds starting from the silica particles and the oxide particles or precursor thereof present in the ceramifiable composition. To this end, the fluxing agent might have the effect of decreasing the melting temperature of the silica favoring its reaction with the alkaline metal oxides generated by the fluxing agent. The thus formed silicates contribute to the formation of the ceramic layer, which is reinforced by the stabilizing agents, particularly by talc. The above combination of components leads to the transformation of the ceramifiable composition of the present invention into a coherent ceramic material capable of resisting to elevated temperatures such as those occurring in case of fire, and withstanding the mechanical stresses, such as those generated by the water jets of the fire-fighting systems. The ceramic layer is also substantially free from visible cracks and swellings impairing its structural integrity.

Conventional additives such as antioxidants, processing coadjuvants, lubricants, pigments and the like can be added to the ceramifiable composition of the present invention.

Conventional antioxidants which are suitable for this purpose are, for example: polymerized trimethyldihydroquinoline, 4,4'-thiobis(3-methyl-6-tert-butyl)phenol; pentaerythryltetra-[3-(3,5-di-tert-butyl-4-hydroxyphenyl)propionate], 2,2'-thio-diethylene bis[3-(3,5-di-tert-butyl-4-hydroxy-phenyl)propionate] and the like, or mixtures thereof.

Processing coadjuvants usually added to the polymer base are, for example, calcium stearate, zinc stearate, stearic acid, paraffin wax, silicone rubbers and the like, or mixtures thereof.

The ceramifiable composition can be prepared by mixing its components with any suitable method known in the art of polymer preparation such as internal mixers, twin screw extruders, kneaders, ribbon blenders and the like.

The ceramifiable composition according to the present invention may be prepared by mixing the thermoplastic polymer mixture, the silica, the fluxing agent, the stabilizing agent, the at least one hydroxide compound and the other additives which may be present according to techniques known in the art, for example using an internal mixer of the type containing tangential rotors (Banbury) or interlocking rotors, or in continuous mixers of the Ko-Kneader (Buss) type or of the co-rotating or counter-rotating twin-screw type.

The ceramifiable composition according to the present invention may be used to make a sheath external to a conductor previously coated with an insulating layer or, in the case of optical fibres, a protecting coating system typically comprising a primary and/or a secondary coating and, optionally, a buffer coating. Moreover, the ceramifiable composition according to the present invention may be used to make the filling material forming a continuous structure having a substantially cylindrical shape around a plurality of conductors (bedding).

The application of the ceramifiable composition can be carried out, for example, by extrusion. When two layers made of the ceramifiable composition are present, the extrusion can be carried out in two separate stages, i.e. by extruding the inner layer onto the conductor in a first run and then the outer layer onto this inner layer in a second run. Advantageously, the extrusion of multiple layer can be carried out in a single run, for example by means of a "tandem" method, in which two separate extruders arranged in series are used, or alternatively by co-extrusion using a single extrusion head.

The Mooney viscosity (ISO 289-1, 2012) of the ceramifiable composition of the present invention is within the range 27-32 Mooney units. The ceramifiable composition of the present invention is thus easily extrudable with the conventional extruding devices known in the art.

BRIEF DESCRIPTION OF THE DRAWINGS

Further characteristics will be apparent from the detailed description given hereinafter with reference to the accompanying drawing, in which.

DETAILED DESCRIPTION OF THE PREFERRED EMBODIMENTS

Figure 1:
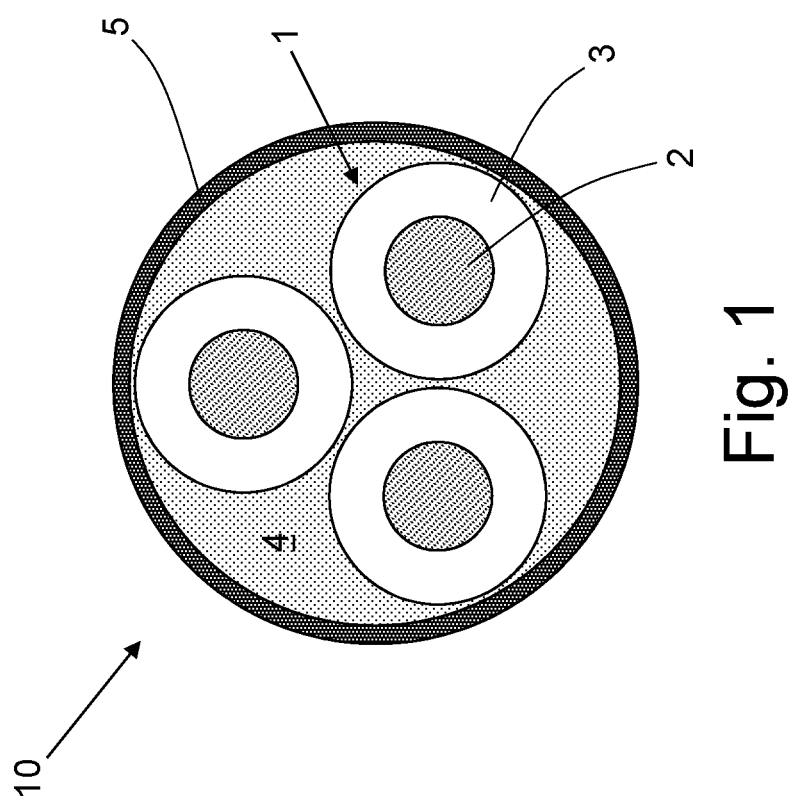
FIG. 1 is a cross section view of a cable according to the invention for power transmission at low voltage.

With reference to FIG. 1, the fire resistant power cable 10 according to the present invention may be of the tripolar type comprising three electrically conducting elements or conductors 2 each covered by an insulating layer 3 to form a core 1. The three conductors 2 with the relevant insulating layers 3 are encircled by an outer sheath 5. The three cores 1 are stranded together forming interstitial zones defined as the spaces between the cores 1 and the cylinder (the outer sheath 5) enveloping such cores. A bedding or interstitial filler 4 fills said interstitial zones.

The insulating constant $k_i$ of the electrical insulating layer 3 is such that the required electric insulating properties are compatible with the standards (e.g. IEC 60502-1, 2004 or other equivalent thereto). For instance, the electrical insulating layer 3 has an insulating constant $k_i$ equal to or greater than 3.67 MOhm.km at 90° C.

The conductors 2 can be in form of a solid rod or of bundled wires made of electrically conductive metal such as copper or aluminum or composite thereof.

According to a first embodiment, the outer sheath 5 is made of the ceramifiable composition of the present invention.

According to a second embodiment, the bedding 4 is made of the ceramifiable composition of the present invention.

Figure 2:
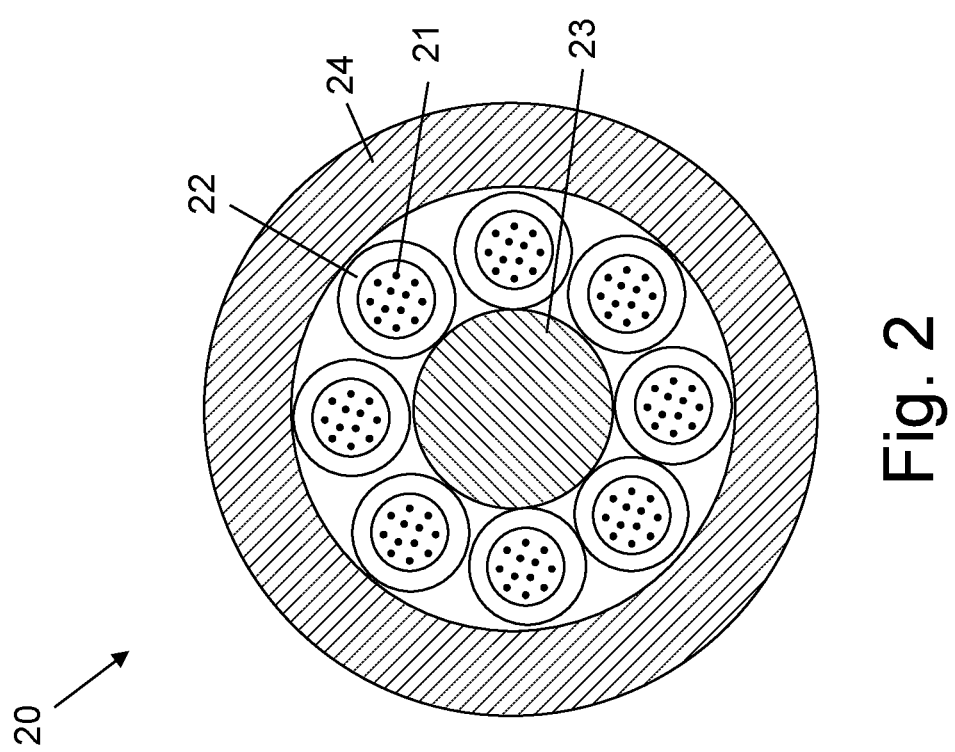
FIG. 2 shows a cross section view of a cable according to the invention for telecommunication.

With reference to FIG. 2, a fire resistant telecommunication cable 20 according to the present invention comprises a plurality of optical fibres 21 (comprising a glass core and cladding a polymeric protecting coating system) grouped and housed into modules 22 in polymeric material, optionally further containing water-blocking material (not shown) in form of gel or filaments. The modules 22 are stranded around a central strength member 23 and a jacket 24 surrounds modules and strength member.

According to an embodiment of the invention, the jacket 24 and/or modules 22 is/are made of the ceramifiable composition of the present invention.

The present description shows only some embodiments of a cable according to the invention. Suitable modifications can be made to these embodiments according to specific technical needs and application requirements without departing from the scope of the invention.

The following examples are provided to further illustrate the invention.

EXAMPLES

Samples of the ceramifiable composition according to the present invention were prepared by mixing all of the components in a Banbury internal mixer (volume: 1.6 l; filling factor 85%; speed rotation: 50-75 rpm; discharge temperature of the compound: 220° C.). Comparative samples were also prepared using the same apparatus and process. The samples were prepared using components and amounts (expressed as wt % based on the total weight of the composition) as set forth in Table 1.

TABLE 1

| | Composition of samples | | | | | | | | |
|---|---|---|---|---|---|---|---|---|---|
| | 1 | 2 | 3* | 4* | 5* | 6* | 7* | 8* | 9 |
| Polymer (a) | 29.2 | 28.1 | 27.2 | 26.7 | 26.7 | 30.6 | 28.1 | 28.1 | 28.7 |
| Polymer (b) | 7.3 | 7.0 | 6.8 | — | 8.4 | 7.7 | 7.0 | 7.0 | 7.2 |
| Polymer (c) | 3.7 | 3.5 | 3.4 | 2.0 | 3.2 | 4.6 | 3.5 | 3.5 | 5.4 |
| Comparative Polymer | — | — | — | 9.6 | — | — | — | — | — |
| SiO$_2$ | 32.9 | 31.6 | 30.6 | 42.0 | 42.0 | 23.0 | 31.6 | 31.6 | 32.2 |
| Al(OH)$_3$ | 1.8 | 1.8 | 1.7 | 1.9 | 1.9 | 3.8$^a$ | 1.8 | 1.8 | 1.8 |
| CaO | 3.2 | 3.1 | 2.7 | 3.4 | 3.4 | — | 3.1 | 3.1 | 3.1 |
| Talc (Mg$_3$Si$_4$O$_{10}$(OH$_2$) | 11 | 10.5 | 13.6 | — | — | — | — | — | 10.7 |
| PbO | — | 3.9 | 3.8 | 4.2 | 4.2 | — | 3.9 | 3.9 | — |

TABLE 1-continued

| Composition of samples | 1 | 2 | 3* | 4* | 5* | 6* | 7* | 8* | 9 |
|---|---|---|---|---|---|---|---|---|---|
| MgO | — | — | — | 0.6 | 0.6 | — | — | — | — |
| Zn borate | — | — | — | — | — | 24.1 | — | — | — |
| Kaolin | — | — | — | — | — | — | 10.5 | — | — |
| Hydromagnesite + Huntite | — | — | — | — | — | — | — | 10.5 | — |
| $Na_2CO_3$ | 8.9 | 8.6 | 8.3 | 7.5 | 7.5 | 4.1 | 8.6 | 8.6 | 8.8 |
| Additives | 2.0 | 1.9 | 1.9 | 2.1 | 2.1 | 2.1 | 1.9 | 1.9 | 2.1 |

$^a$As $Al_2O_3$

Polymer (a): ethylene-octene copolymer (30 wt % of octane with respect to the copolymer weight); density=0.885 g/cc (ASTM D792), MFI=1.00 g/10 min (190° C./2.16 kg; ASTM D1238), melting point=78.0° C.);

Polymer (b): linear low density polyethylene; density=0.911 g/cm$^3$ (ASTM D1505), MFI=3.00 g/10 min (190° C./2.16 kg; ASTM D1238), melting point=118.0° C.);

Comparative Polymer: linear low density polyethylene; density=0.911 g/cm$^3$ (ASTM D1505), MFI=13.00 g/10 min (190° C./2.16 kg; ASTM D1238), melting point=116.0° C.);

Polymer (c): maleic anhydride grafted polyethylene; density=0.93 g/cm$^3$ ($^{ASTM\,D}$792), MFI=1.75 g/10 min (190° C./2.16 kg; ASTM D1238), melting point=120.0° C.);

$SiO_2$: amorphous silica, BET=20 m$^2$/g, $D_{50}$=150 nm;

Hydromagnesite: $Mg_3Ca(CO_3)_4$;

Huntite: $Mg_4(CO_3)_3(OH)_2 \cdot 3H_2O$;

Additives: stearic acid (processing aid), pentaerythritol tetrakis (3-(3,5-di-tert-butyl-4-hydroxyphenyl) propionate) (antioxidant), tetrakismethylene (3,5-di-tert-butyl-4-hydroxyhydrocinnamate) methane (antioxidant).

The compositions marked with an asterisk are comparative examples.

Each composition was printed in form of plaques by printing at 180° C. using a mechanical press and then tested. In particular, mechanical properties, i.e. elongation at break (EB—expressed as percentage) and tensile strength (TS —expressed in Mpa) were evaluated at room temperature (20° C.) on 200×200×1 mm plaques, while the fire-tests were performed on tablets obtained from 150×100×3 mm plaques. The mechanical properties tests were repeated after ageing the samples in air oven (168 hours, 100° C.) and in mineral oil (4 hours, 70° C., Oil IRM 902), and the variations are reported in Table 2 (ΔTS and ΔEB).

The fire tests were carried out by placing the tablets in a muffle furnace at temperatures of 400° C., 600° C., 800° C. and 1000° C. The tablets behavior under heating were evaluated by visual inspection and, when cooled down, by soft and hard hammering to assay the char integrity.

The results of the mechanical and fire tests are reported in Table 2.

TABLE 2

| Mechanical and fire tests. | 1 | 2 | 3* | 4* | 5* | 6* | 7* | 8* | 9 |
|---|---|---|---|---|---|---|---|---|---|
| TS | 9.9 | 11.7 | <9 | 4.8 | 6.9 | 11.0 | 11.1 | 10.5 | 11.2 |
| EB | 481.3 | 491 | <120 | 131 | 235 | 391 | 566 | 513 | 463 |
| TS @ 100° C. | 10.0 | 11.4 | — | — | — | 11.9 | 11.3 | 10 | 12.5 |
| EB @ 100° C. | 452.5 | 377 | — | — | — | 295 | 509 | 481 | 416 |
| ΔTS @ 100° C. | — | -3 | — | — | — | 8 | 2 | -4 | — |
| ΔEB @ 100° C. | -6 | -23 | — | — | — | -25 | -10 | -6 | — |
| ΔTS in oil | -6 | -15 | — | — | — | -3 | 10 | -19 | — |
| ΔEB in oil | 35 | 12 | — | — | — | 25 | 12 | -12 | — |
| Fire test | YES | YES | — | YES | YES | NO | NO | NO | YES |

According to IEC 60092-359:SHF1 (1994), EB should be greater than 120% and TS should be greater than 9.0 MPa.

According to IEC 60502/2 ST8 (2005), after air oven ageing the TS should be greater than 9 MPa.

According to IEC 60502/2 SE1 (2005), after air oven ageing the EB should be greater than 250%.

According to UNE 21123-4 (2014), after ageing in mineral oil, the TS should not differ from the TS measured prior to ageing (ΔTS) more than ±40% (difference referred to the values measured prior to ageing).

According to UNE 21123-4 (2014), after ageing in mineral oil, the EB should not differ from the EB measured prior to ageing (ΔEB) more than ±40% (difference referred to the values measured prior to ageing).

A "YES" fire test means that the sample maintained its integrity and shape with no cracks compromising its mechanical resistance or swellings at temperatures up to 1000° C.

From the experimental data reported in Table 2, it can be seen Samples 1-2 and 6-9 had mechanical features according to the standard.

The mechanical behavior of comparative sample 3* was impaired by an excessive amount of talc (greater than 12 wt %). The mechanical behavior of comparative sample 4* was impaired by the use of a polymer (b) having a MFI greater than 5 g/10 min and by the lack of a hydrated magnesium silicate (talc). Comparative sample 5*, lacking a hydrated magnesium silicate too, has poor a mechanical behavior, though slightly better than that of comparative sample 4*, because comparative sample 5* contains a polymer (b) according to the invention.

Comparative samples 6*-8* showed that replacement of a hydrated magnesium silicate (talc) in the compositions with zinc borate, kaolin or hydromagnesite/huntite does not provide a composition with satisfactory fire resistant properties.

The samples prepared with the compositions of the present invention (samples 1, 2 and 9), besides having a mechanical behaviour making them suitable for the manufacturing of a cable layer, ceramified by heating up to 1000° C. and gave place to a solid ceramified layer with only superficial cracks not compromising their integrity.

The invention claimed is:

1. A fire resistant cable (10; 20) comprising:
   a conducting element (2; 21);
   a layer, surrounding the conducting element, made of a ceramifiable composition comprising:
      a thermoplastic polymer mixture comprising:
      (a) a copolymer of ethylene with a $C_4$-$C_{12}$ alpha-olefin, having a density of from 0.860 to 0.910 g/cm$^3$, a melt flow index not higher than 3 g/10 min and a melting point of 105° C. at most;
      (b) an ethylene homopolymer or copolymer of ethylene with a $C_4$-$C_{12}$ alpha-olefin, having a density of from 0.900 to 0.985 g/cm$^3$, a melt flow index not higher than 5 g/10 min and a melting point of at least 110° C.; and
      (c) a polyethylene grafted with an ethylenically unsaturated monomer;
      at least 25 wt % of silica;
      a fluxing agent selected from alkaline metal oxides or precursors thereof;
      an inorganic hydroxide compound selected from magnesium hydroxide, aluminium hydroxide and mixtures thereof;
      a stabilizing agent comprising a hydrated magnesium silicate in an amount of at least 5 wt %;
   weight percentages being based on the total weight of the ceramifiable composition.

2. The fire resistant cable according to claim 1 wherein the thermoplastic polymer mixture comprises:
   (a) from 65 parts to 90 parts of the copolymer of ethylene with a $C_4$-$C_{12}$ alpha-olefin, having a density of from 0.860 to 0.910 g/cm$^3$, a melt flow index not higher than 3 g/10 min and a melting point of 105° C. at most;
   (b) from 10 parts to 30 parts of the ethylene homopolymer or copolymer of ethylene with a $C_4$-$C_{12}$ alpha-olefin, having a density of from 0.900 to 0.985 g/cm$^3$, a melt flow index not higher than 5 g/10 min and a melting point of at least 110° C.; and
   (c) from 5 parts to 15 parts of the polyethylene grafted with an ethylenically unsaturated monomer
   the parts being parts by weight of the component with respect to 100 parts by weight of the thermoplastic polymer mixture.

3. The fire resistant cable according to claim 1 wherein the thermoplastic polymer mixture is present in an amount of at least 25 wt % based on the weight of the ceramifiable composition.

4. The fire resistant cable according to claim 1, wherein the silica is an amorphous silica made of substantially spherical particles.

5. The fire resistant cable according to claim 1, wherein the stabilizing agent further comprises at least one of MgO, CaO, PbO or a precursor thereof.

6. The fire resistant cable according to claim 1, wherein the hydroxide compound is aluminium hydroxide.

7. The fire resistant cable according to claim 1, wherein the silica is present in an amount up to 40 wt %, based on the weight of the ceramifiable composition.

8. The fire resistant cable according to claim 1, wherein the fluxing agent is present in an amount of at least 5 wt % with respect to the weight of the ceramifiable composition.

9. The fire resistant cable according to claim 1, wherein the hydroxide compound is present in an amount of from 0.1 wt % to 5 wt % based the weight of the ceramifiable composition.

10. The fire resistant cable according to claim 1, wherein the hydrated magnesium silicate as stabilizing agent is present in an amount lower than 13 wt % based on the weight of the ceramifiable composition.

11. The fire resistant cable according to claim 1, wherein the ceramifiable composition comprises from 6 wt % to 25 wt % of stabilizing agent based on the weight of the ceramifiable composition.

12. The fire resistant cable according to claim 1 which is a power cable (10) where the layer made of a ceramifiable composition is a bedding layer (4) and/or an outer sheath (5).

13. The fire resistant cable according to claim 1 which is a telecommunication cable (20) where the layer made of a ceramifiable composition is a jacket layer (24).

14. An extrudable ceramifiable composition comprising:
   a thermoplastic polymer mixture comprising:
   (a) a copolymer of ethylene with a $C_4$-$C_{12}$ alpha-olefin, having a density of from 0.860 to 0.910 g/cm$^3$, a melt flow index not higher than 3 g/10 min and a melting point of 105° C. at most;
   (b) an ethylene homopolymer or copolymer of ethylene with a $C_4$-$C_{12}$ alpha-olefin, having a density of from 0.900 to 0.985 g/cm$^3$, a melt flow index not higher than 5 g/10 min and a melting point of at least 110° C.; and
   (c) a polyethylene grafted with an ethylenically unsaturated monomer;
   at least 25 wt % of silica;
   a fluxing agent selected from alkaline metal oxides or precursors thereof;
   an inorganic hydroxide compound selected from magnesium hydroxide, aluminium hydroxide and mixtures thereof;
   a stabilizing agent comprising a hydrated magnesium silicate in an amount of at least 5 wt %.

* * * * *